UNITED STATES PATENT OFFICE.

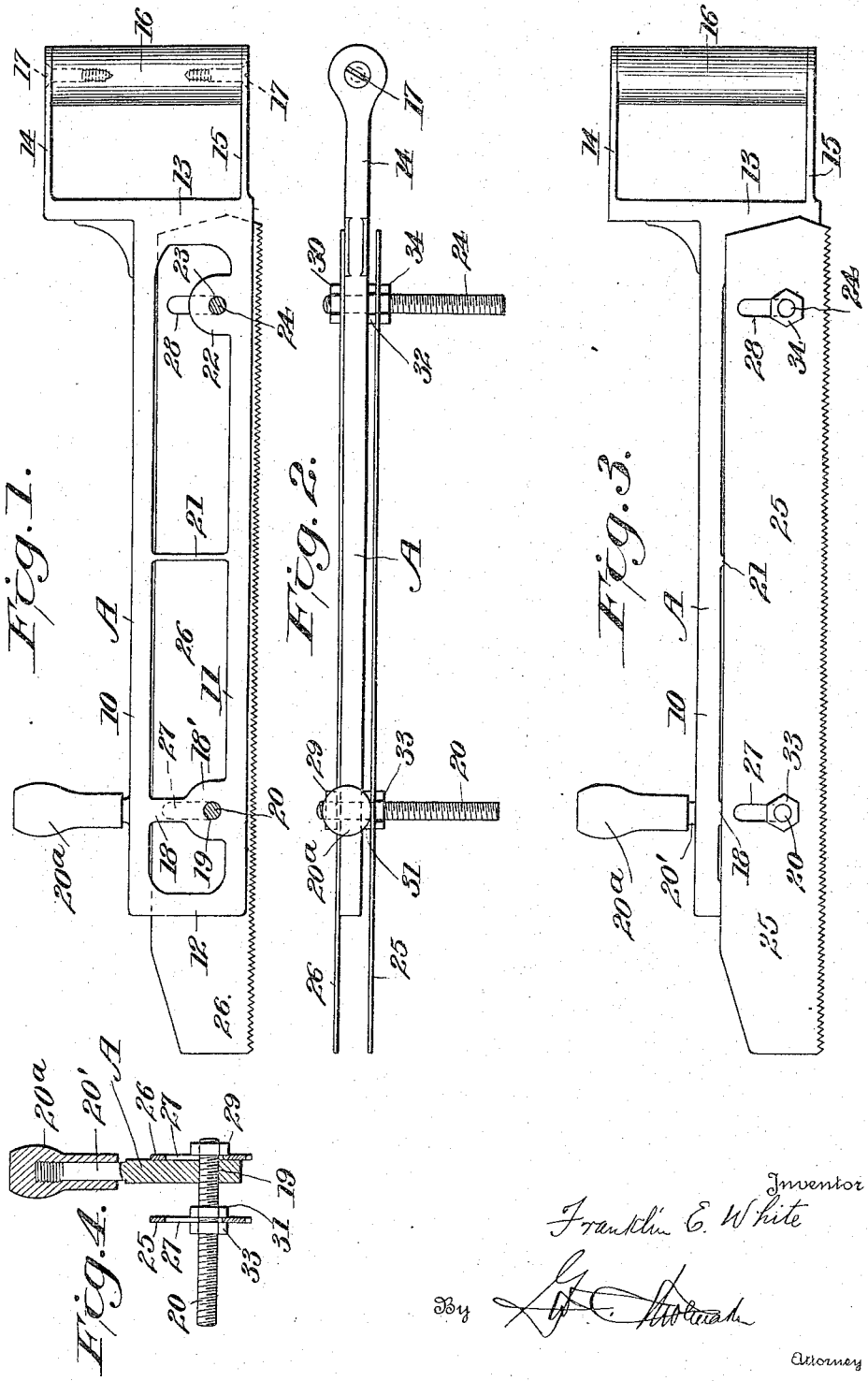

FRANKLIN E. WHITE, OF FORTY FORT, PENNSYLVANIA.

DADO-SAW.

1,228,728.   Specification of Letters Patent.   Patented June 5, 1917.

Application filed December 5, 1916. Serial No. 135,195.

*To all whom it may concern:*

Be it known that I, FRANKLIN E. WHITE, a citizen of the United States, residing at Forty Fort, in the county of Luzerne and State of Pennsylvania, have invented certain new and useful Improvements in Dado-Saws, of which the following is a specification.

This invention relates to dado saws.

One object is to provide a dado saw, embodying among other characteristics, means whereby the saw may be readily adjusted for cutting grooves of various widths and depths in boards.

Another object resides in the provision of a simple, inexpensive, durable, light, strong dado saw holder frame.

With the above and other objects in view, the present invention consists in the combination and arrangement of parts hereinafter more fully described, illustrated in the accompanying drawings, and particularly pointed out in the appended claims, it being understood that changes may be made in the form, size, proportion and minor details without departing from the spirit or sacrificing any of the advantages of the invention.

In the drawings:

Figure 1 is a longitudinal sectional view of the invention.

Fig. 2 is a top plan view.

Fig. 3 is a side elevation of the invention.

Fig. 4 is a transverse sectional view.

Referring now more particularly to the accompanying drawings, the reference character A indicates a dado or hack-saw holder frame comprising longitudinal upper and lower bars 10 and 11 connected at their ends by the webs 12 and 13, the latter web 13 extending laterally outward beyond the bar 10 and from the ends of this web 13, upper and lower handle straps 14 and 15 extend and to the outer ends of which a handle 16 may be secured by fastenings 17 or in any other suitable manner.

The longitudinal bars 10 and 11 of the holder frame are connected adjacent their outer ends by a web 18 and a lug 18', the latter projecting inwardly from the bar 11 and provided with a screw threaded perforation 19 in which a relatively long screw 20 has working fit for a purpose presently explained. A part 20' extends outwardly from the bar 10 in alinement with the web 18, forming a shank to receive the forward handle 20ª.

The bars 10 and 11 of the holder frame are preferably connected for strengthening purposes intermediate their ends by a web 21 and the bar 11 adjacent the connecting web 13, is provided with an inwardly directed lug 22 provided with a screw-threaded aperture 23. A relatively long threaded bolt 24 has working fit in the screw-threaded aperture 23 of the lug 22 for a purpose presently explained.

Saw blades are indicated at 25 and 26. The saw blades each have spaced transversely disposed slots 27 and 28 which are adapted to lie normally in alinement with the respective screw-threaded apertures 19 and 23 in the holder frame. The bolts 20 and 24 are passed transversely through the respective screw-threaded apertures in the holder frame and through the respective slots in the saws. The bolts 20 and 24 carry nuts 29 and 30, respectively, on one end and these nuts are adapted to lie firmly against the outer face of the saw blade 26.

Nuts 31 and 32 are carried by said bolts 20 and 24, respectively, and are adapted to lie between the saw blade 25 and the adjacent side face of the holder frame A. The saw blade 25 is clamped against these nuts 31 and 32 by means of nuts 33 and 34 working on the screw-threaded bolts 20 and 24, whereby, by virtue of the coöperating clamp nuts 31 and 33 and 32 and 35, the saw blade 25 may be held firmly in various adjusted positions along the bolts 20 and 24 with relation to the adjacent side of the holder frame and thereby provide an adjustment which enables the sawing or formation of grooves of various widths. The depths of the grooves may be readily adjusted by loosening the aforesaid nuts and shifting the slots 27 and 28 in the saw blades on the bolts 20 and 24.

What I claim, is:—

1. A dado-saw comprising a holder frame consisting of spaced parallel bars connected at their ends, a handle secured to one end of said frame, a handle secured to said frame adjacent the opposite end thereof, one of said bars having inwardly projecting lugs provided with screw-threaded apertures, screw-threaded bolts fitted in said screw-threaded apertures and projecting beyond opposite sides of the holder frame, saw blades each having transverse slots therein adapted to aline with the aforesaid screw-threaded apertures and which slots receive said bolts, one of said saw blades adapted to lie against one side of the holder frame, a set of nuts having working fit on said bolts to clamp the latter blade against the side of the holder frame, another set of nuts on said bolts on the opposite side of the holder frame and disposed therebetween and the other of said blades, and another set of nuts having working fit on said bolts to clamp said other blade adjustably on the bolts against the second set of nuts, whereby the blades may be adjusted to vary the depth and width of grooves.

2. A dado-saw comprising a holder frame consisting of spaced parallel bars connected at their ends, one of the end connecting pieces of said bars having spaced projections, a handle between said projections, a second handle secured to the holder frame, the bars being connected by a web intermediate their ends, one of the bars having inwardly directed lugs provided with screw-threaded apertures, screw-threaded bolts fitted in said apertures and projecting beyond opposite sides of the holder frame, saw blades each having transverse slots therein adapted to aline with the aforesaid screw-threaded apertures and which slots receive said bolts, one of said saw blades adapted to lie against one side of the holder frame, a set of nuts having working fit on said bolts to clamp the latter blade against the side of the holder frame, another set of nuts on said bolts between the holder frame and the other of said blades, another set of nuts having working fit on said bolts to clamp said other blade adjustable on the bolts against the second set of nuts, whereby the blades may be adjusted to vary the depth and width of grooves.

In testimony whereof I affix my signature in the presence of a witness.

FRANKLIN E. WHITE.

Witness:
EDWARD N. NOLL.

Copies of this patent may be obtained for five cents each, by addressing the "Commissioner of Patents, Washington, D. C."